United States Patent
Weber et al.

(10) Patent No.: US 9,051,432 B2
(45) Date of Patent: *Jun. 9, 2015

(54) METHOD FOR PRODUCING LOW-CHLORINE POLYBIPHENYL SULFONE POLYMERS

(75) Inventors: Martin Weber, Maikammer (DE); Christian Maletzko, Altrip (DE); Gerhard Lange, Schriesheim (DE); Jörg Erbes, Karlsruhe (DE); Matthias Dietrich, Weinheim (DE); Nicholas Inchaurrondo, Mannheim (DE)

(73) Assignee: BASF SE, Ludwigshafen (DE)

(*) Notice: Subject to any disclaimer, the term of this patent is extended or adjusted under 35 U.S.C. 154(b) by 576 days.

This patent is subject to a terminal disclaimer.

(21) Appl. No.: 13/262,727

(22) PCT Filed: Mar. 30, 2010

(86) PCT No.: PCT/EP2010/054206
§ 371 (c)(1),
(2), (4) Date: Oct. 3, 2011

(87) PCT Pub. No.: WO2010/112508
PCT Pub. Date: Oct. 7, 2010

(65) Prior Publication Data
US 2012/0029106 A1 Feb. 2, 2012

(30) Foreign Application Priority Data
Apr. 3, 2009 (EP) .................... 09157282

(51) Int. Cl.
*C08G 8/02* (2006.01)
*C08G 75/23* (2006.01)

(52) U.S. Cl.
CPC .................... *C08G 75/23* (2013.01)

(58) Field of Classification Search
USPC ......... 528/125, 126, 128, 173, 176, 179, 182, 528/193, 194; 525/471
See application file for complete search history.

(56) References Cited

U.S. PATENT DOCUMENTS

| | | | |
|---|---|---|---|
| 4,200,728 A | 4/1980 | Blinne et al. | |
| 5,047,496 A | 9/1991 | Eckel et al. | |
| 7,993,792 B2 * | 8/2011 | Maier et al. | 429/492 |
| 2001/0047050 A1 | 11/2001 | Oyamada et al. | |
| 2005/0228149 A1 * | 10/2005 | Trivedi et al. | 525/535 |
| 2010/0184898 A1 | 7/2010 | Weber et al. | |
| 2010/0190897 A1 | 7/2010 | Maletzko et al. | |
| 2010/0197859 A1 | 8/2010 | Weber et al. | |
| 2010/0286303 A1 | 11/2010 | Weber et al. | |
| 2011/0009566 A1 | 1/2011 | Jain et al. | |
| 2011/0155309 A1 | 6/2011 | Steininger et al. | |
| 2011/0196098 A1 | 8/2011 | Mettlach et al. | |
| 2011/0201747 A1 | 8/2011 | Weber et al. | |
| 2011/0218294 A1 | 9/2011 | Weber et al. | |
| 2011/0224386 A1 | 9/2011 | Weber et al. | |
| 2011/0237693 A1 | 9/2011 | Weber et al. | |
| 2011/0237694 A1 | 9/2011 | Weber et al. | |
| 2011/0244743 A1 | 10/2011 | Scherzer et al. | |
| 2011/0251337 A1 | 10/2011 | Weber et al. | |
| 2011/0294912 A1 | 12/2011 | Weber et al. | |
| 2011/0319550 A1 | 12/2011 | Weber et al. | |
| 2012/0059109 A1 | 3/2012 | Weber et al. | |
| 2012/0149796 A1 | 6/2012 | Weber et al. | |

FOREIGN PATENT DOCUMENTS

| | | |
|---|---|---|
| CN | 1942506 | 4/2007 |
| DE | 1957091 A1 | 6/1970 |
| DE | 10117715 A1 | 11/2001 |
| EP | 000361 A1 | 1/1979 |
| EP | 0347669 A2 | 12/1989 |
| EP | 1272547 A2 | 1/2003 |
| GB | 1264900 A | 2/1972 |
| JP | H01-318040 | 12/1989 |
| JP | H03-95220 | 4/1991 |
| JP | H03-153737 | 7/1991 |
| JP | 2002-525406 | 8/2002 |
| JP | 2003-506515 | 2/2003 |
| WO | WO-00/18824 | 4/2000 |
| WO | WO-00/18824 A1 | 4/2000 |
| WO | WO-01/09248 | 2/2001 |
| WO | WO-01/66620 A2 | 9/2001 |
| WO | WO-2005/095491 | 2/2005 |
| WO | WO 2009/003901 | 1/2009 |
| WO | WO 2009/034114 | 3/2009 |
| WO | WO 2010/089241 | 8/2010 |

(Continued)

OTHER PUBLICATIONS

Koch, E. M., et al., "Polysulfon (PSU)", Technische Kunststoffe, Hochleistungswerkstoffe, (1990), vol. 80, pp. 1146-1149.

(Continued)

*Primary Examiner* — Shane Fang
(74) *Attorney, Agent, or Firm* — Drinker Biddle & Reath LLP

(57) ABSTRACT

The present invention relates to a process for the production of low-chlorine-content polybiphenyl sulfone polymers, to the polybiphenyl sulfone polymers obtainable in this way, to polybiphenyl sulfone polymers with less than 800 ppm content of organically bonded chlorine, to thermoplastic molding compositions and moldings, fibers, films, membranes, or foams comprising the polybiphenyl sulfone polymers mentioned, and also to their use for the production of moldings, of fibers, of films, of membranes, or of foams.

3 Claims, No Drawings

(56) References Cited

FOREIGN PATENT DOCUMENTS

| WO | PCT/EP2010/069644 | 12/2010 |
|----|-------------------|---------|
| WO | WO 2011/000816 | 1/2011 |
| WO | WO 2011/009798 | 1/2011 |
| WO | WO 2011/051273 | 5/2011 |
| WO | WO 2011/069892 | 6/2011 |
| WO | WO 2011/073196 | 6/2011 |
| WO | WO 2011/073197 | 6/2011 |
| WO | WO 2011/117344 | 9/2011 |

OTHER PUBLICATIONS

Döring, E., Polyethersulfon (PES), Technische Kunststoffe, Hochleistungswerkstoffe, (1990), vol. 80, pp. 1149-1154.

Inchaurrondo-Nehm, N., "Polyarylsulfone (PSU, PESU, PPSU)", Kunststoffe, (2008), pp. 190-195.

Viswanathan, R., et al., "Synthesis, Kinetic Observations and Characteristics of Polyarylene Ether Sulphones Prepared via a Potassium Carbonate DMAC Process", Polymer, vol. 25, (1984), pp. 1827-1836.

U.S. Appl. No. 61/316,848.
U.S. Appl. No. 13/267,628, filed Oct. 6, 2011, Scherzer et al.
U.S. Appl. No. 13/376,665, filed Dec. 7, 2011, Weber et al.
U.S. Appl. no. 13/376,901, filed Dec. 8, 2011, Gibon et al.
U.S. Appl. No. 13/377,979, filed Dec. 13, 2011, Khvorost et al.
U.S. Appl. No. 13/382,782, filed Jan. 6, 2012, Scherzer et al.
U.S. Appl. No. 13/391,082, filed Feb. 17, 2012, Shahim et al.
U.S. Appl. No. 13/378,980, filed Mar. 1, 2012, Schmidt et al.

International Search Report for PCT/EP2010/054206, mailing date Jun. 25, 2010.

International Preliminary Report on Patentability (German and English Translation) for PCT/EP2010/054206, dated May 26, 2011.

* cited by examiner

METHOD FOR PRODUCING LOW-CHLORINE POLYBIPHENYL SULFONE POLYMERS

CROSS-REFERENCE TO RELATED APPLICATIONS

This application is a national stage application (under 35 U.S.C. §371) of PCT/EP2010/054206, filed Mar. 30, 2010, which claims benefit of EP 09157282.6, filed Apr. 3, 2009.

BACKGROUND OF THE INVENTION

The present invention relates to a process for the production of low-chlorine-content polybiphenyl sulfone polymers, to the polybiphenyl sulfone polymers obtainable in this way, to polybiphenyl sulfone polymers with less than 800 ppm content of organically bonded chlorine, to thermoplastic molding compositions and moldings, fibers, films, membranes, or foams comprising the polybiphenyl sulfone polymers mentioned, and also to their use for the production of moldings, of fibers, of films, of membranes, or of foams.

Polybiphenyl sulfone polymers belong to the polyarylene ethers group, and therefore to the class of engineering thermoplastics. Polybiphenyl sulfone polymers have not only high heat resistance but superior notched impact resistance and excellent fire performance, as described by way of example in: E. M. Koch, H.-M. Walter, Kunststoffe 80 (1990) 1146; E. Döring, Kunststoffe 80, (1990) 1149; and N. Inchaurondo-Nehm, Kunststoffe 98, (2008) 190.

The production of polybiphenyl sulfone polymers is disclosed by way of example in DE 1957091 and EP 000361. WO 2000/018824 discloses a process for the production of polybiphenyl sulfone polymers having low content of cyclic oligomers. EP 1272547 describes polybiphenyl sulfone polymers with a particularly low level of intrinsic color, obtained via condensation of the monomers 4,4'-dihydroxybiphenyl and 4,4'-dichlorodiphenyl sulfone in the presence of fine-particle potash.

The prior art usually uses equimolar amounts of the starting materials. However, the resultant content of organically bonded chlorine in the polybiphenyl sulfone polymers from known processes is too high for many applications and often fails to comply with fire-protection requirements. Chlorine contents of less than 1000 ppm are often demanded for applications in the electronics sector, e.g. switches, casings, foils. The known polybiphenyl sulfone polymers moreover have high residual solvent content.

The reaction of the abovementioned monomers in N-methylpyrrolidone (NMP) as solvent is also known per se, for example from EP 0 347 669. NMP has inter alia a number of advantages in terms of process technology. By way of example, the monomers and the potassium carbonate used as base have good solubility in NMP; it is moreover possible to conduct a reaction without any additional entrainer for the water produced by the reaction. Process-technology reasons therefore, make it desirable that the polycondensation reaction for the production of polybiphenyl sulfone polymers is carried out in NMP as solvent.

The abovementioned monomers have extremely high reactivity in NMP as solvent. In many instances when NMP is used as solvent, this generates problems in control of intrinsic viscosity (IV), which characterizes the degree of polymerization.

The person skilled in the art is aware from J. E. McGrath et al., Polymer 25 (1984), 1827 of a method of controlling molecular weight in the condensation of polyarylene sulfones based on bisphenol A. Commercial polyarylene ethers, e.g. Sumika Excel®, have mainly chlorine end groups. No process hitherto disclosed produces polybiphenyl sulfone polymers in NMP by using an excess of the aromatic dihydroxy compound.

The tensile strain at break of the polybiphenyl sulfone polymers known from the prior art is moreover in many instances inadequate; the notched impact resistance of these polymers is unsatisfactory, and they often have inadequate flow behavior at low shear rates.

BRIEF SUMMARY OF THE INVENTION

The polybiphenyl sulfone polymers of the present invention should have the aforementioned disadvantages to a relatively minor degree, if at all. A particular object of the present invention was to provide a process which can produce polybiphenyl sulfone polymers having the properties mentioned with good control of molecular weight. The polybiphenyl sulfone polymers should in particular have low viscosity at low shear rate and have good flow within a mold.

Another object of the present invention was to provide polybiphenyl sulfone polymers which have superior mechanical properties, in particular high tensile strain at break and high notched impact resistance, and which comprise low content of polymer-bonded chlorine and which moreover have less residual solvent content than the prior art. The prior art has not hitherto disclosed any polybiphenyl sulfone polymers with less than 800 ppm content of polymer-bonded chlorine.

The present object is achieved via a process for the production of polybiphenyl sulfone polymers comprising according to step (a) the reaction of component (a1) composed of at least one aromatic dihydroxy compound and (a2) 4,4'-dichlorodiphenyl sulfone, where component (a1) comprises 4,4'-dihydroxybiphenyl and the reaction is carried out with a molar excess of component (a1) in a solvent comprising N-methylpyrrolidone, and also via the resultant polybiphenyl sulfone polymers. Preferred embodiments can be found in the claims and in the description below. Combinations of preferred embodiments are within the scope of the invention.

DETAILED DESCRIPTION OF THE INVENTION

The term polybiphenyl sulfone polymer is intended to mean polyarylene ether sulfones which comprise 4,4'-dihydroxybiphenyl as monomer unit. Polybiphenyl sulfone itself is also known as polyphenyl sulfone, abbreviated to PPSU, and is composed of the following monomer units: 4,4'-dichlorodiphenyl sulfone and 4,4'-dihydroxybiphenyl.

For the purposes of the present invention, in order to characterize the structure of the polybiphenyl sulfone polymer, reference is made to the monomer units used. It is obvious to the person skilled in the art that the monomer units are present in reacted form within the polymer, and that the reaction of the monomer units via nucleophilic aromatic polycondensation takes place with theoretical elimination of one unit of hydrogen halide as leaving group. The structure of the resultant polymer is therefore independent of the precise nature of the leaving group.

The reaction of the components (a1) and (a2) to form a polybiphenyl polymer is known per se to the person skilled in the art, in terms of the temperature, the solvent and the duration. The reaction of the starting compounds (a1) and (a2) is carried out at a temperature of from 80 to 250° C., preferably from 100 to 220° C., where the boiling point of the solvent provides the upper temperature limit. The reaction time is preferably from 2 to 12 h, in particular from 3 to 8 h.

The use of an excess of component (a1) makes a contribution to a reduction in content of polymer-bonded chlorine, in particular at high conversions. The molar ratio of component (a1) to (a2) used is preferably from 1.005 to 1.2, in particular from 1.005 to 1.1. In one particularly preferred embodiment, the molar ratio of component (a1) to (a2) is from 1.005 to 1.08, in particular from 1.01 to 1.05, very particularly preferably from 1.015 to 1.04. This enables particularly effective control of molecular weight.

It is advantageous for the present invention that the reaction conditions are selected in such a way that conversion (C) is at least 90%, in particular at least 95%, particularly preferably at least 98%. For the purposes of the present invention, conversion C is the molar proportion of reactive groups (i.e. hydroxy and chloro groups) that have been reacted. The final product has relatively broad molecular weight distribution, where appropriate inclusive of oligomers, and the end groups here are either chloro or hydroxy groups, or, in the event of further reaction, alkyl- or aryloxy groups, corresponding arithmetically to the difference from 100% conversion.

Surprisingly, it has been found that the content of polymer-bonded chlorine observed is particularly low when the solvent used comprises N-methylpyrrolidone. N-Methylpyrrolidone is very particularly preferred as sole solvent. N-Methylpyrrolidone at the same time contributes to high conversion of components (a1) and (a2), since the reaction of the monomers used according to the invention proceeds particularly efficiently.

According to the invention, component (a1) is composed of at least one aromatic dihydroxy compound, and comprises 4,4'-dihydroxybiphenyl. Component (a1) can in particular comprise the following compounds:

dihydroxybenzenes, in particular hydroquinone and/or resorcinol;
dihydroxynaphthalenes, in particular 1,5-dihydroxynaphthalene, 1,6-dihydroxynaphthalene, 1,7-dihydroxynaphthalene, and/or 2,7-dihydroxynaphthalene;
dihydroxybiphenyls other than 4,4'-dihydroxybiphenyl, in particular 2,2'-dihydroxybiphenyl;
bisphenyl ethers, in particular bis(4-hydroxyphenyl) ether and bis(2-hydroxyphenyl) ether;
bisphenylpropanes, in particular 2,2-bis(4-hydroxyphenyl)propane, 2,2-bis(3-methyl-4-hydroxyphenyl)propane, and/or 2,2-bis(3,5-dimethyl-4-hydroxyphenyl)propane;
bisphenylmethanes, in particular bis(4-hydroxyphenyl) methane;
bisphenylcyclohexanes, in particular bis(4-hydroxyphenyl)-2,2,4-trimethylcyclohexane;
bisphenyl sulfones, in particular bis(4-hydroxyphenyl) sulfone;
bisphenyl sulfides, in particular bis(4-hydroxyphenyl) sulfide;
bisphenyl ketones, in particular bis(4-hydroxyphenyl) ketone;
bisphenylhexafluoropropanes, in particular 2,2-bis(3,5-dimethyl-4-hydroxyphenyl)hexafluoropropane; and/or
bisphenylfluorenes, in particular 9,9-bis(4-hydroxyphenyl)fluorene.

Component (a1) preferably comprises at least 50% by weight, in particular at least 60% by weight, particularly preferably at least 80% by weight, of 4,4'-dihydroxybiphenyl. It is very particularly preferable that component (a1) is 4,4'-dihydroxybiphenyl.

For the purposes of the present invention, solvents that can be used in a mixture with N-methyl-2-pyrrolidone (NMP) are aprotic polar solvents other than NMP. The boiling point of suitable solvents here is in the range from 80 to 320° C., in particular from 100 to 280° C., preferably from 150 to 250° C. Particularly suitable polar aprotic solvents are high-boiling-point ethers, esters, ketones, asymmetrically halogenated hydrocarbons, anisole, dimethylformamide, dimethyl sulfoxide, and sulfolane. However, particular preference is given to N-methyl-2-pyrrolidone (NMP) as solvent.

The reaction of the components (a1) and (a2) preferably takes place in the presence of a base (B), in order to increase reactivity with respect to the halogen substituents of the starting compounds (a2). It is preferable to start from the abovementioned aromatic dihydroxy compounds (a1) and add a base (B) to produce their dipotassium or disodium salts, and react these with component (a1). The person skilled in the art is aware of suitable bases (B). Preferred bases (B) are in particular alkali metal carbonates.

The bases are preferably anhydrous. Particularly suitable bases are anhydrous alkali metal carbonate, preferably sodium carbonate, potassium carbonate, calcium carbonate, or a mixture thereof, very particular preference being given to potassium carbonate. One particularly preferred combination is N-methyl-2-pyrrolidone as solvent and anhydrous potassium carbonate as base.

It has also proven advantageous for the purposes of step (a) to set the amount of the polybiphenyl sulfone polymer to from 10 to 70% by weight, preferably from 15 to 50% by weight, based on the total weight of the mixture composed of polybiphenyl sulfone polymer and solvent.

In one preferred embodiment, during or after the reaction at least one aromatic organic monochloro compound is added as component (a3). It is believed that the aromatic organic monochloro compound acts as chain regulator. It is preferable that the reactivity of the aromatic organic monochloro compound in the reaction is similar to that of component (a2).

Component (a3) is preferably an aromatic monochloro sulfone, in particular monochlorodiphenyl sulfone. In one preferred embodiment, the excess of component (a1) is compensated via the aromatic organic monochloro compound (a3), which comprises one chloro group reactive under the conditions of the reaction of components (a1) and (a2).

The molar amount of component (a3) is preferably selected in such a way that the product when the excess of the molar amount of component (a1) with respect to the molar amount of component (a2) divided by the molar amount of component (a3) is multiplied by two is from 0.98 to 1.02, in particular from 0.99 to 1.01. Accordingly, $2*((a1)-(a2))/(a3)$ is preferably from 0.98 to 1.02, in particular from 0.99 to 1.01, where (a1), (a2), and (a3) are the molar amounts used of the respective components.

It is preferable here that the product when the ratio $((a1)-(a2)/(a3))$ is multiplied by two is 1.

In another preferred embodiment, which can advantageously be linked to the abovementioned embodiments, according to step (b), after step (a), a reaction takes place with at least one aliphatic organic halogen compound. The result is further reaction of reactive hydroxy end groups, thus inhibiting degradation of the polymer chain.

Preferred aliphatic organic halogen compounds are alkyl halides, in particular alkyl chlorides having linear or branched alkyl groups having from 1 to 10 carbon atoms, in particular primary alkyl chlorides, particularly preferably methyl halide, in particular methyl chloride.

The reaction of step (b) is preferably carried out at a temperature of from 90° to 160° C., in particular from 100° C. to 150° C. The duration can vary widely and is usually at least 5 minutes, in particular at least 15 minutes. The duration of the reaction of step (b) is preferably from 15 minutes to 8 hours, in particular from 30 minutes to 4 hours.

Various methods can be used to add the aliphatic organic halogen compound. The amount added of the aliphatic organic halogen compound can moreover be stoichiometric or an excess, and by way of example the excess can be up to 5-fold. In one preferred embodiment, the aliphatic organic halogen compound is added continuously, in particular via continuous introduction in the form of a gas stream.

It has proven advantageous, after step (a) and optionally step (b), to filter the polymer solution. The result is to remove the salt content formed in the polycondensation reaction, and also to remove any gel formed.

The present invention further provides polybiphenyl sulfone polymers which are obtainable according to the process of the invention, and also polybiphenyl sulfone polymers with less than 800 ppm content of polymer-bonded chlorine, in particular less than 700 ppm.

The polybiphenyl sulfone polymers of the invention preferably have less than 800 ppm content of polymer-bonded chlorine, in particular less than 750 ppm, particularly preferably less than 700 ppm. The lower limit of content of polymer-bonded chlorine is usually at least 400 ppm, in particular at least 500 ppm, as a function of the process.

The chlorine content of the polymer that can be obtained corresponds to the content of chloro end groups and for the purposes of the present invention is determined by means of atomic spectroscopy. For the purposes of the present invention, the content of polymer-bonded chlorine is based in principle on the proportion by weight, and as an alternative it can be stated in mg per kg of starting weight of the polymer.

Polymer compositions obtainable by the process of the invention particularly preferably have less than 700 ppm content of polymer-bonded chlorine and at the same time less than 500 ppm content of residual solvent.

Another feature of the polybiphenyl sulfone polymers of the invention is tensile strain at break of more than 50% in the tensile test.

The present invention further provides thermoplastic molding compositions comprising a polybiphenyl sulfone polymer of the invention.

The thermoplastic molding compositions of the present invention can also comprise, alongside the polybiphenyl sulfone polymer of the invention, at least one polymer selected from polyarylene ether sulfones (other than the polybiphenyl sulfone polymers of the invention), in particular polyether sulfone (PES) and/or polysulfone (PSU), or else polyetherimides, polyphenylene sulfides, polyether ether ketones, polyimides, or poly-p-phenylenes.

The molding compositions of the invention can moreover comprise fillers, in particular fibers, particularly preferably glass fibers. A person skilled in the art is aware of appropriate fillers.

To the extent that fillers are used, the preferred amount of these then added is from 5 to 150 parts by weight, based on 100 parts by weight of polymer.

In particular, the thermoplastic molding compositions of the invention can comprise any of the glass fibers that are known to the person skilled in the art and that are suitable for use in thermoplastic molding compositions. Said glass fibers can be produced by the process known to the person skilled in the art and can optionally be surface-treated. The glass fibers can have been equipped with a size in order to improve compatibility with the matrix material, e.g. as described in DE 10117715.

In one preferred embodiment, glass fibers of diameter from 5 to 15 μm, preferably from 7 to 13 μm, particularly preferably from 9 to 11 μm, are used.

The glass fibers incorporated can take the form either of chopped glass fibers or else of continuous-filament strands (rovings). The length of the glass fibers that can be used is generally and typically from 4 to 5 mm prior to incorporation in the form of chopped glass fibers into the thermoplastic molding compositions. The average length of the glass fibers after processing of the same, for example via coextrusion, with the other components, is usually from 100 to 400 μm, preferably from 200 to 350 μm.

The molding compositions of the invention can comprise, as further component K, auxiliaries, in particular processing aids, pigments, stabilizers, flame retardants, or a mixture of different additives. Other examples of conventional added materials are oxidation retarders, heat stabilizers, UV stabilizers, lubricants and mold-release agents, dyes, and plasticizers.

The content of the further components K in the molding compositions of the invention is in particular from 0 up to 30% by weight, preferably from 0 up to 20% by weight, in particular from 0 to 15% by weight, based on the total weight of the thermoplastic molding composition. In the event that component K involves stabilizers, the content of these stabilizers is usually up to 2% by weight, preferably from 0.01 to 1% by weight, in particular from 0.01 to 0.5% by weight, based on the total weight of the thermoplastic molding composition.

The amounts generally comprised of pigments and dyes are from 0 to 10% by weight, preferably from 0.05 to 7% by weight, and in particular from 0.1 to 5% by weight, based on the total weight of the thermoplastic molding composition.

Pigments for the coloring of thermoplastics are well known, see for example R. Gächter and H. Müller, Taschenbuch der Kunststoffadditive [Plastics additives handbook], Carl Hanser Verlag, 1983, pages 494 to 510. A first preferred group of pigments that may be mentioned are white pigments, such as zinc oxide, zinc sulfide, white lead [$2 PbCO_3.Pb(OH)_2$], lithopones, antimony white, and titanium dioxide. Of the two most familiar crystalline forms of titanium dioxide (rutile and anatase), it is in particular the rutile form which is used for white coloring of the molding compositions of the invention. Black color pigments which can be used according to the invention are iron oxide black ($Fe_3O_4$), spinell black [$Cu(Cr,Fe)_2O_4$], manganese black (a mixture composed of manganese dioxide, silicon dioxide, and iron oxide), cobalt black, and antimony black, and also particularly preferably carbon black, which is mostly used in the form of furnace black or gas black. In this connection see G. Benzing, Pigmente für Anstrichmittel [Pigments for paints], Expert-Verlag (1988), pages 78 ff.

Particular color shades can be achieved by using inorganic chromatic pigments, such as chromium oxide green, or organic chromatic pigments, such as azo pigments or phthalocyanines. Pigments of this type are generally commercially available.

Examples of oxidation retarders and heat stabilizers which can be added to the thermoplastic compositions according to the invention are halides of metals of group I of the Periodic Table of the Elements, e.g. sodium halides, potassium halides, or lithium halides, examples being chlorides, bromides, or iodides. Zinc fluoride and zinc chloride can moreover be used. It is also possible to use sterically hindered phenols, hydroquinones, substituted representatives of said group, secondary aromatic amines, optionally in combination with phosphorus-containing acids, or to use their salts, or a mixture of said compounds, preferably in concentrations up to 1% by weight, based on the total weight of the thermoplastic molding composition.

Examples of UV stabilizers are various substituted resorcinols, salicylates, benzotriazoles, and benzophenones, the amounts generally used of these being up to 2% by weight.

Lubricants and mold-release agents, the amounts of which added are generally up to 1% by weight, based on the total weight of the thermoplastic molding composition, are stearyl alcohol, alkyl stearates, and stearamides, and also esters of pentaerythritol with long-chain fatty acids. It is also possible to use dialkyl ketones, such as distearyl ketone.

The molding compositions of the invention comprise, as preferred constituent, from 0.1 to 2% by weight, preferably from 0.1 to 1.75% by weight, particularly preferably from 0.1 to 1.5% by weight, and in particular from 0.1 to 0.9% by weight (based on the total weight of the thermoplastic molding composition) of stearic acid and/or stearates. Other stearic acid derivatives can in principle also be used, examples being esters of stearic acid.

Stearic acid is preferably produced via hydrolysis of fats. The products thus obtained are usually mixtures composed of stearic acid and palmitic acid. These products therefore have a wide softening range, for example from 50 to 70° C., as a function of the constitution of the product. Preference is given to use of products with more than 20% by weight content of stearic acid, particularly preferably more than 25% by weight. It is also possible to use pure stearic acid (>98%).

The molding compositions of the invention can moreover also comprise stearates. Stearates can be produced either via reaction of corresponding sodium salts with metal salt solutions (e.g. $CaCl_2$, $MgCl_2$, aluminum salts) or via direct reaction of the fatty acid with metal hydroxide (see for example Baerlocher Additives, 2005). It is preferable to use aluminum tristearate.

The constituents of the thermoplastic molding composition of the invention can be mixed in any desired sequence.

The molding compositions of the invention can be produced by processes known per se, for example extrusion. The molding compositions of the invention can by way of example be produced by mixing the starting components in conventional mixing devices, such as screw-based extruders, preferably twin-screw extruders, Brabender mixers, or Banbury mixers, or else kneaders, followed by extrusion. The extrudate is cooled and comminuted. The sequence of mixing of the components can be varied and, for example, two or optionally three components can be premixed, but it is also possible to mix all of the components together.

Intensive mixing is advantageous in order to maximize homogeneity of mixing. Average mixing times necessary for this are generally from 0.2 to 30 minutes, at temperatures of from 280 to 380° C., preferably from 290 to 370° C. The extrudate is generally cooled and comminuted.

The molding compositions of the invention feature good flowability, high toughness, especially tensile strain at break and notched impact resistance, and high surface quality. The molding compositions of the invention are therefore suitable for the production of moldings for household items, or for electrical or electronic components, and also for moldings for the vehicle sector.

The thermoplastic molding compositions of the invention can be used advantageously for the production of moldings, of fibers, of films, of membranes, or of foams. Accordingly, the present invention further provides moldings, fibers, films, membranes or foams comprising the thermoplastic molding compositions of the invention.

The examples below provide further explanation of the invention, without restricting the same.

EXAMPLES

The intrinsic viscosity of the polybiphenyl sulfones was determined in 1% strength N-methylpyrrolidone solution at 25° C.

The products obtained were pelletized at melt temperature 370° C. in a twin-screw extruder (ZSK 18). Processing to give test specimens took place at melt temperature 375° C. and mold temperature 160° C.

The tensile tests were conducted to ISO 527, and notched impact resistance was determined to ISO 179 1eA.

Flowability of the products was determined at 380° C. in a capillary rheometer. The method is described by way of example in "Praktische Rheologie der Kunststoffe und Elastomere" [Practical rheology of plastics and elastomers] VDI Verlag 1991, page 234 ff. The ratio of viscosity at high (2000 Hz) and low shear rate (50 Hz) was evaluated.

The purity of the monomers used (4,4'-dichlorodiphenyl sulfone, 4,4'-dihydroxybiphenyl) was more than 99.5%.

Various qualities of anhydrous $K_2CO_3$ were used. The average particle size is volume-average particle diameter and was determined on a suspension of the particles in a mixture of chlorobenzene and sulfolane (60/40 parts by weight), using a Mastersizer 2000 particle measurement device.

Potash A: average particle size 61 μm
Potash B: average particle size 120 μm.

Comparative Example 1

A polybiphenyl sulfone was obtained via nucleophilic aromatic polycondensation of 287.08 g (1.00 mol) of 4,4'-dichlorodiphenyl sulfone, and 186.21 g (1.00 mol) of 4,4'-dihydroxybiphenyl, using 145.12 g (1.05 mol) of potassium carbonate (potash A) in 1050 ml of NMP. This mixture was kept at 190° C. for 1 hour. The mixture was then diluted by adding 975 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 110.3 ml/g, its glass transition temperature being 226° C. High melt viscosity prevented pelletization of the product.

Comparative Example 2

A polybiphenyl sulfone was obtained via nucleophilic aromatic polycondensation of 287.08 g (1.00 mol) of 4,4'-dichlorodiphenyl sulfone, and 186.21 g (1.00 mol) of 4,4'-dihydroxybiphenyl, using 145.12 g (1.05 mol) of potassium carbonate (potash A) in 1050 ml of NMP. This mixture was kept at 180° C. for 2 hours. The mixture was then diluted by adding 450 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 115.2 ml/g, its glass transition temperature being 226° C. High melt viscosity prevented pelletization of the product.

Comparative Example 3

A polybiphenyl sulfone was obtained via nucleophilic aromatic polycondensation of 287.08 g (1.00 mol) of 4,4'-dichlorodiphenyl sulfone, and 186.21 g (1.00 mol) of 4,4'-dihydroxybiphenyl, using 143.05 g (1.035 mol) of potassium carbonate (potash A) in 1050 ml of NMP. This mixture was kept at 190° C. for 2.16 hours. The mixture was then diluted by adding 450 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 58.6 ml/g, its glass transition temperature being 225° C.

Comparative Example 4

A polybiphenyl sulfone was obtained via nucleophilic aromatic polycondensation of 574.16 g (2.00 mol) of 4,4'-dichlorodiphenyl sulfone, and 372.42 g (2.00 mol) of 4,4'-dihydroxybiphenyl, using 280.56 g (2.03 mol) of potassium carbonate (potash A) in 2100 ml of NMP. This mixture was kept at 180° C. for 6.25 hours. The mixture was then diluted by adding 900 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 82.9 ml/g, its glass transition temperature being 227° C.

Comparative Example 5

Excess of DCDPS

A polybiphenyl sulfone was obtained via nucleophilic aromatic polycondensation of 586.75 g (2.044 mol) of 4,4'-dichlorodiphenyl sulfone, and 372.42 g (2.00 mol) of 4,4'-dihydroxybiphenyl, using 286.09 g (2.07 mol) of potassium carbonate (potash A) in 2100 ml of NMP. This mixture was kept at 180° C. for 6 hours. The mixture was then diluted by adding 900 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 72.8 ml/g, its glass transition temperature being 225° C.

Comparative Example 6

Excess of DCDPS

A polybiphenyl sulfone was obtained via nucleophilic aromatic polycondensation of 586.75 g (2.044 mol) of 4,4'-dichlorodiphenyl sulfone, and 372.42 g (2.00 mol) of 4,4'-dihydroxybiphenyl, using 286.09 g (2.07 mol) of potassium carbonate (potash A) in 2100 ml of NMP. This mixture was kept at 180° C. for 6 hours. The mixture was then diluted by adding 900 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 71.3 ml/g, its glass transition temperature being 225° C.

Example 7

Excess of 4,4'-dihydroxybiphenyl

A polybiphenyl sulfone was obtained via nucleophilic aromatic polycondensation of 574.16 g (2.00 mol) of 4,4'-dichlorodiphenyl sulfone, and 379.87 g (2.04 mol) of 4,4'-dihydroxybiphenyl, using 286.09 g (2.07 mol) of potassium carbonate (potash A) in 2100 ml of NMP. This mixture was kept at 190° C. for 6 hours. The mixture was then diluted by adding 900 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 71.2 ml/g, its glass transition temperature being 225° C.

Example 8

Excess of 4,4'-dihydroxybiphenyl

A polybiphenyl sulfone was obtained via nucleophilic aromatic polycondensation of 574.16 g (2.00 mol) of 4,4'-dichlorodiphenyl sulfone, and 379.87 g (2.04 mol) of 4,4'-dihydroxybiphenyl, using 286.09 g (2.07 mol) of potassium carbonate (potash A) in 2100 ml of NMP. This mixture was kept at 190° C. for 6 hours. The mixture was then diluted by adding 900 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 72.0 ml/g, its glass transition temperature being 225° C.

Example 9

Excess of 4,4'-dihydroxybiphenyl

A polybiphenyl sulfone was obtained via nucleophilic aromatic polycondensation of 574.16 g (2.00 mol) of 4,4'-dichlorodiphenyl sulfone, and 379.87 g (2.04 mol) of 4,4'-dihydroxybiphenyl, using 286.09 g (2.07 mol) of potassium carbonate (potash B) in 2100 ml of NMP. This mixture was kept at 190° C. for 8 hours. The mixture was then diluted by adding 900 ml of NMP. The suspension was then reacted with methyl chloride (15 l/h) for 1 hour at 130° C. After cooling to 80° C., the suspension was discharged, the solid constituents were removed by filtration, and the polymer was isolated via precipitation in 1/9 NMP/water. The product was carefully washed with water and then dried for 12 h in vacuo at 120° C. The intrinsic viscosity of the product was 72.0 ml/g, its glass transition temperature being 225° C.

TABLE 1

| Example | comp1 | comp2 | comp3 | comp4 | comp5 | comp6 | 7 | 8 | 9 |
|---|---|---|---|---|---|---|---|---|---|
| Cl content [ppm] | 1400 | 1370 | 2200 | 1450 | 3050 | 3150 | 710 | 670 | 560 |
| Solvent content [ppm] | n.d. | n.d. | 120 | 100 | 110 | 120 | 100 | 60 | 80 |
| Modulus of elasticity [MPa] | — | — | 2260 | 2260 | 2280 | 2270 | 2280 | 2260 | 2270 |
| Tensile strain at break [%] | — | — | 33 | 47 | 21 | 22 | 78 | 81 | 76 |
| ISO 179 1eA [kJ/m$^2$] | — | — | 68 | 67 | 67 | 66 | 71 | 72 | 72 |
| η(50 Hz)/η(2000 Hz) | — | — | 6.8 | 5.9 | 4.8 | 4.7 | 3.2 | 3.1 | 3.3 |

The process of the invention allows intrinsic viscosity to be controlled by way of reaction time (Examples 7 to 9). At the same time, surprisingly, the polybiphenyl sulfone polymers of the invention exhibit a low ratio of viscosity at shear rate 50 Hz to viscosity at shear rate 2000 Hz. The polybiphenyl sulfone polymers of the invention therefore have advantageous flow behavior at low shear rates, and this is particularly advantageous for shaping in molds.

The polybiphenyl sulfone polymers of the invention also feature a combination of low content of polymer-bonded chlorine, low residual solvent content, and improved tensile strain at break.

The invention claimed is:

1. A process for the production of hydroxy terminated polybiphenyl sulfone polymers comprising (a) reacting component (a1) which comprises at least one aromatic dihydroxy compound and (a2) 4,4'-dichlorodiphenyl sulfone, wherein component (a1) comprises 4,4'-dihydroxydiphenyl and the reaction is carried out with a molar excess of component (a1) in a solvent comprising N-methylpyrrolidone, wherein the molar ratio of component (a1) to (a2) is from 1.01 to 1.05.

2. The process according to claim 1, wherein component (a1) comprises at least 50% by weight of 4,4'-dihydroxybiphenyl.

3. The process according to claim 1, wherein component (a1) is 4,4'-dihydroxybiphenyl.

* * * * *